US006857612B2

(12) United States Patent
Goodbred

(10) Patent No.: US 6,857,612 B2
(45) Date of Patent: Feb. 22, 2005

(54) AUTOMOTIVE SEAT ASSEMBLY HAVING A SELF-CLEARING DRIVE NUT

(75) Inventor: Nell Gentry Goodbred, Northville, MI (US)

(73) Assignee: Lear Corporation, Southfield, MI (US)

( * ) Notice: Subject to any disclaimer, the term of this patent is extended or adjusted under 35 U.S.C. 154(b) by 82 days.

(21) Appl. No.: 10/614,359

(22) Filed: Jul. 7, 2003

(65) Prior Publication Data

US 2005/0006550 A1 Jan. 13, 2005

(51) Int. Cl.[7] ............................................. F16M 13/00
(52) U.S. Cl. ...................... 248/429; 248/424; 74/89.15
(58) Field of Search ................... 248/429, 424; 74/89.15; 297/330

(56) References Cited

U.S. PATENT DOCUMENTS

| | | | | |
|---|---|---|---|---|
| 2,091,374 A | | 8/1937 | Pease | 74/424.8 |
| 2,508,779 A | | 5/1950 | Vocisano | 248/357 |
| 2,580,170 A | * | 12/1951 | Grimmer | 74/89.4 |
| 4,274,293 A | * | 6/1981 | Ruger | 74/89.36 |
| 4,794,810 A | * | 1/1989 | Parsons | 74/424.94 |
| 4,802,374 A | * | 2/1989 | Hamelin et al. | 74/89.14 |
| 5,014,958 A | | 5/1991 | Harney | 248/394 |
| 5,048,886 A | * | 9/1991 | Ito et al. | 296/65.14 |
| 5,150,872 A | * | 9/1992 | Isomura | 248/429 |
| 5,191,672 A | | 3/1993 | Boston et al. | 15/256.5 |
| 5,292,164 A | | 3/1994 | Rees | 296/65.1 |
| 5,456,439 A | | 10/1995 | Gauger | 248/429 |
| 5,467,957 A | * | 11/1995 | Gauger | 248/429 |
| 5,473,958 A | * | 12/1995 | Jeck et al. | 74/89.36 |
| 5,707,035 A | | 1/1998 | Kargol et al. | 248/429 |
| 5,711,184 A | | 1/1998 | Pryor et al. | 74/89.15 |
| 5,762,309 A | | 6/1998 | Zhou et al. | 248/429 |
| 5,769,377 A | | 6/1998 | Gauger | 248/429 |
| 5,797,293 A | * | 8/1998 | Chaban | 74/89.36 |
| 5,797,574 A | | 8/1998 | Brooks et al. | 248/398 |
| 5,860,319 A | | 1/1999 | Via | 74/89.15 |
| 5,938,164 A | | 8/1999 | Kargol et al. | 248/429 |
| 5,941,494 A | * | 8/1999 | Garrido | 248/429 |
| 6,056,257 A | | 5/2000 | Jaisle et al. | 248/424 |
| 6,138,974 A | * | 10/2000 | Okada et al. | 248/429 |
| 6,170,898 B1 | | 1/2001 | Cunningham, II et al. | 296/65.16 |
| 6,179,265 B1 | | 1/2001 | Downey et al. | 248/429 |
| 6,290,199 B1 | * | 9/2001 | Garrido et al. | 248/424 |
| 6,499,712 B1 | * | 12/2002 | Clark et al. | 248/429 |
| 6,588,289 B2 | * | 7/2003 | Ung et al. | 74/89.4 |
| 6,609,595 B2 | * | 8/2003 | Flynn et al. | 188/156 |

* cited by examiner

*Primary Examiner*—Anita M. King
(74) *Attorney, Agent, or Firm*—Bliss McGlynn, P.C.; Bill Panagos

(57) ABSTRACT

An automotive seat assembly including a seat frame having a main portion fixedly mounted to the bottom of a vehicle seat and a riser portion fixedly mounted to the floor pan of a vehicle. A seat drive mechanism is included having at least one drive motor and a threaded lead screw. A drive nut having a through-bore with internal threads that cooperate with the threads of the lead screw is adapted to cause the seat assembly to move relative to the vehicle floor pan in response to the drive motor. The drive nut also includes a second bore formed adjacent to, and extending in the general direction of, the through-bore such that the internal threads of the through-bore are interrupted by the second bore and act to clear the threads of the lead screw and prevent foreign matter that collects on the lead screw from entering the threaded interface between the drive nut and the lead screw.

10 Claims, 6 Drawing Sheets

AUTOMOTIVE SEAT ASSEMBLY HAVING A SELF-CLEARING DRIVE NUT

BACKGROUND OF THE INVENTION

1. Field of the Invention

The present invention relates, generally, to an automotive seat assembly and, more specifically, to a seat assembly that employs a self-clearing drive nut used cooperatively with a lead screw in an adjustable seat drive mechanism.

2. Description of the Related Art

Seat assemblies having power seat adjusters are a popular component in many automotive vehicles. It is known to use power seat adjusters to provide powered horizontal fore and aft adjustment of the vehicle seat, as well as to use power seat adjusters to provide vertical adjustments to raise and lower the seat height. Separate front and rear seat elevation mechanisms have also been employed to independently, as well as simultaneously, adjust the elevation of the front and rear edges of a vehicle seat. Power seat recliners have also been incorporated into power seat adjusters.

Typically, a vehicle power seat adjuster includes a support frame or support members that engage and support the bottom of a vehicle seat. The seat support members are mounted on spaced track assemblies that form a movable frame portion. In turn, the moveable frame portion is slidably mounted in a main track or main support portion of the seat frame that is anchored to the floor pan of the vehicle.

A drive mechanism rotates a threaded lead screw that extends between the movable portion and the fixed main portion of the seat frame. The drive mechanism is typically a bi-directional electric motor mounted between the main and movable frame portions. Often, two lead screws are used, one on each side of the seat frame, to provide smooth fore and aft movement. In these applications, the motor has two drive shafts each driving a separate gear assembly or gearbox, each gearbox further connected to the individual lead screws. This can provide torque multiplication, speed reduction, or both, to the lead screw as may be required for the particular application.

If the drive motor is mounted on the main portion of the seat frame, then a drive block or drive nut is fixedly connected to the movable frame portion. The drive nut has an internally threaded through-bore that receives the threaded lead screw. This allows selective control of the motor to effect reciprocal movement of the movable frame portion in a fore and aft direction relative to the main portion of the seat frame. Also, in some applications, the motor may be mounted on the movable portion with the drive nuts fixed to the main portion of the seat frame.

To allow for vertical movement of the front and back ends of the seat, a similar drive motor, gear box, and threaded lead screw drive are mounted between the main frame portion and a second movable frame portion that is operatively hinged to the main portion of the seat frame. Some more sophisticated seat drive mechanisms also employ additional drive motors, lead screws and drive nuts, to allow for the control of pivotal movement of the seat back with respect to the seat bottom. While the seat drive mechanisms of the type generally known in the related art work well as initially installed, they are prone to certain operational complications over time that impact the drive mechanism's ability to properly function. This occurs due to the general operating environment in which the seat drive mechanisms must function.

The threaded interaction between each of the lead screws and their respective drive nuts must be clean and lubricated in order to ensure proper and repeatable operation. Due to the length and travel range of the lead screws, they must remain open to their surrounding environment under the vehicle seat. It has proven impractical to attempt to encase or enclose the lead screw and drive nut assemblies. On the other hand, the physical area under the seats of most vehicles ultimately becomes cluttered and generally unclean. In fact, the under seat area is prone to collecting dust and dirt just through normal use of a motor vehicle and also becomes a receptacle for all manner of objects. The nature of this operating environment introduces a wide variety of foreign objects to the threads of the lead screws. This means that as the lead screws sit, they collect all manner of debris in their threads. Then, as the seat drive mechanisms are operated, the male threads of the lead screws carry this foreign matter into the cooperative female threads of the drive nut. The introduction of foreign matter to the threaded interaction of the lead screw and the drive nut may cause binding, slow and labored operation, and ultimately jamming of the seat drive mechanism.

In response to this problem, some corrective measures have been attempted in the related art with limited success. It is known to construct a drive nut that is made of a plastic, or nylon-type material that is somewhat soft and self-lubricating. The self-lubrication nature of these types of materials avoid having to apply a separate lubricating media to the lead screw, which reduces some collection of foreign matter on the lead screw, but does not eliminate it. Drive nuts made of these soft and somewhat giving materials can also tolerate some amount of foreign material stuck in their threads before a binding condition occurs, but again, this does not eliminate the problem. It is also known to thread the lead screws and their respective drive nuts with an "Acme" thread profile. This specific thread configuration generally provides for a closer tolerance fit between the male threads of the lead screw and the female threads of the drive nut at the entry thread area and reduces the tolerance gap at the thread crest and root interface area. Both of these changes reduce the opportunity for foreign matter to enter into the threads. However, this only slows the onset of a binding or jamming condition and does not eliminate the problem.

Therefore, there remains a need in the art for a seat assembly that employs a drive nut that is capable of a maintaining a proper threaded interaction with a lead screw but avoids the binding and jamming condition that occurs by the introduction of foreign matter to the drive nut threads from the lead screw threads.

SUMMARY OF THE INVENTION

The disadvantages of the related art are overcome by the present invention that provides an automotive seat assembly having a self-clearing drive nut. The seat assembly includes a seat frame having a main portion fixedly mounted to the bottom of a vehicle seat and a riser portion fixedly mounted to the floor pan of a vehicle. The riser portion includes a first pair of tracks and the main portion includes a cooperative second pair of tracks such that the main portion is moveably supported with respect to the riser portion along the first and second pair of tracks. A seat drive mechanism including at least one drive motor is operatively connected in driven relationship with respect to the drive motor. The lead screw has external threads defined thereon. A drive nut is also included that has a through-bore with internal threads that cooperate with the threads of the lead screw. The drive nut is adapted to cause the seat assembly to move in at least two opposed directions relative to the vehicle floor pan in response to the drive motor. Further, the drive nut also includes a second bore formed adjacent to the through-bore and extending in the general direction of the through-bore such that the internal threads of the through-bore are interrupted by the second bore. The interrupted threads of the through-bore act to clear the threads of the lead screw and cause foreign matter that collects on the lead screw to be captured by the second bore and prevented from entering the thread interface between the drive nut and the lead screw. The present invention counteracts any collection of debris on the lead screw, which causes binding and jamming of the seat drive mechanism. Thus, the present invention provides for smooth and trouble free operation of the seat assembly.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
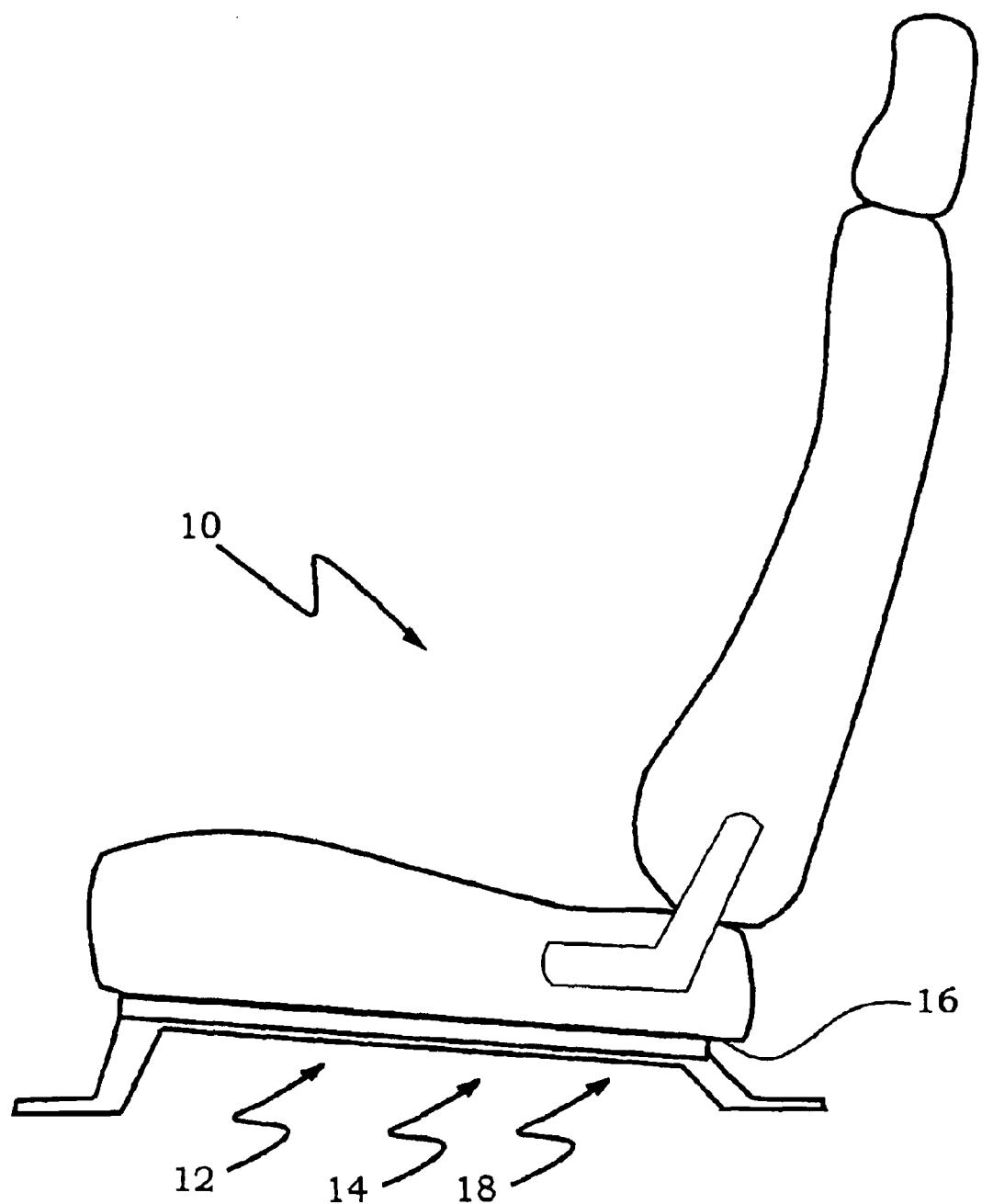
FIG. 1 is a side view of a seat assembly of the present invention.

A seat assembly having a self-clearing drive nut of the present invention is generally indicated as 10 in FIG. 1 where like numerals are employed to designate like structure throughout the figures. The seat assembly 10 is power adjustable and selectively allows the operator move the seat assembly to any of a wide variety of positions. A power seat adjuster frame, generally indicated at 12, is employed to provide the motive force and physical positioning of the seat assembly 10. As shown in greater detail in FIG. 2A, the power seat adjuster frame 12 is a so-called "six-way" adjuster, which provides horizontal fore and aft, and vertical up and down movement of the front and rear ends of the seat assembly 10. By controlling the power seat adjuster frame 12, hereafter referred to simply as the seat frame, the front and rear ends of the seat assembly 10 may be moved either jointly to provide changes in elevation or separately to provide a frontward or rearward tilt of the seat. It should be appreciated that the particular seat assembly shown and described herein has been chosen for the purpose of illustration and not for the purposes of limiting the present invention. Thus, the self-clearing drive nut of the present invention is applicable to any one of a variety of adjustable seat assemblies as long as a lead screw and drive nut arrangement are utilized.

Figure 2A:
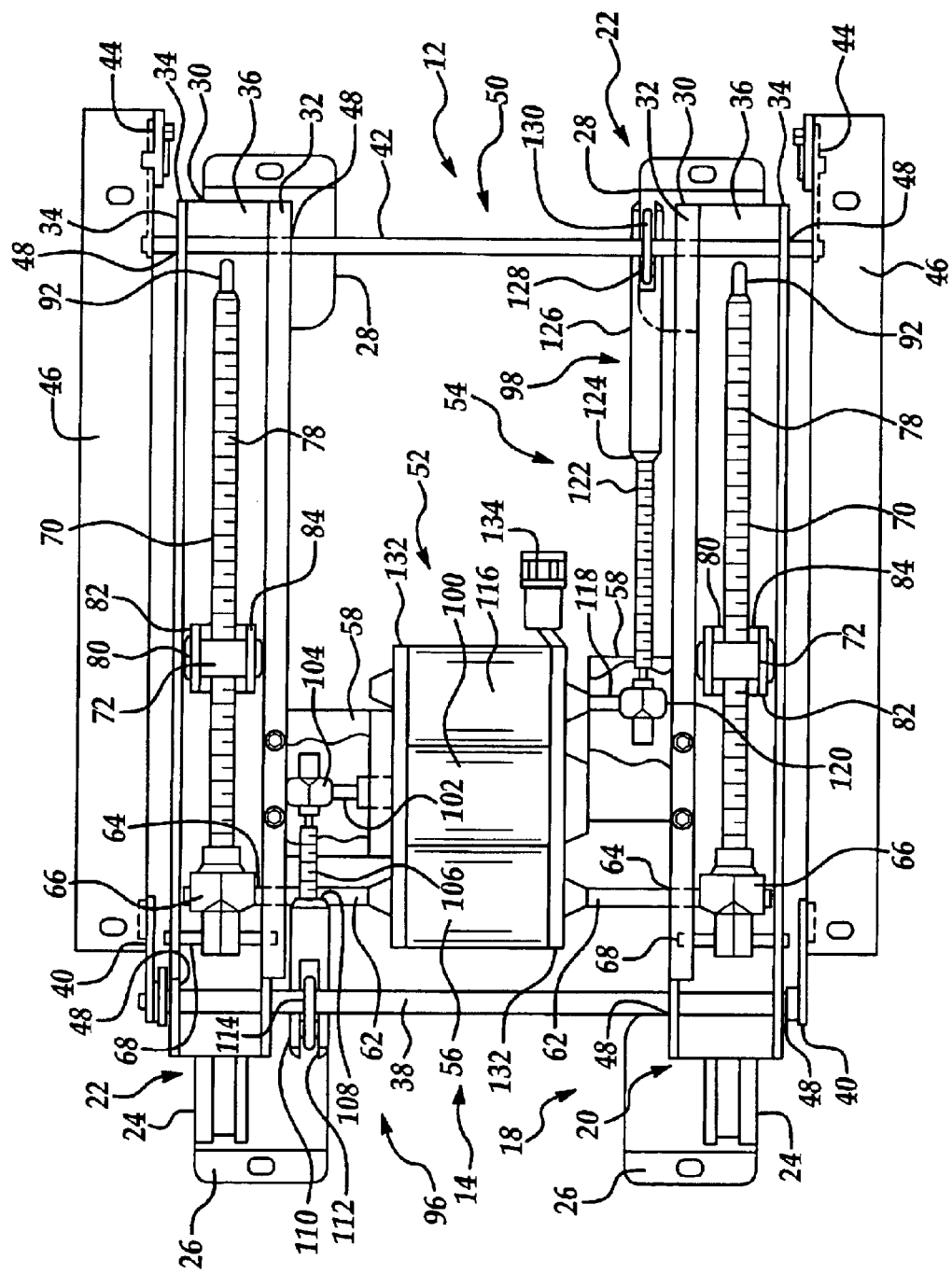
FIG. 2A is a top view of a seat frame of the present invention having a seat drive mechanism.

As illustrated in FIGS. 1 and 2A, the front of the seat frame 12 is to the left and the rear of the seat frame 12 is to the right. The seat frame 12 has a main portion generally indicated at 14, which is fixedly mounted to the bottom of a vehicle seat 16 (FIG. 1) and a riser portion generally indicated at 18, which is fixedly mounted to the floor pan of a vehicle. The main portion 14 includes a pair of upper track assemblies, generally indicated at 20. The riser portion 18 includes a cooperative pair of lower track assemblies, generally indicated at 22. The main portion 14 is moveably supported with respect to the riser portion 18 along the upper and lower track assemblies 20 and 22.

More specifically, each of the lower track assemblies 22 include a lower track 24, a front riser support 26, and a rear riser support 28. The front riser 26 is connected by means of suitable fasteners, such as rivets, to the front end of the lower track 24. Similarly, the rear riser 28 is connected to the rear end of the lower track 24. The front and rear risers 26 and 28 are anchored by suitable fasteners to the vehicle floor pan in a conventional manner such that the lower track assemblies 22 are securely mounted to the vehicle floor pan in a spaced parallel relationship to each other and thereby cooperatively form the riser portion 18 of the seat frame 12.

In regard to the main portion 14 of the seat frame 12, each of the upper track assemblies 20 include an upper track 30. Each upper track 30 has a pair of opposed sidewalls 32, 34 and a central base 36 that is integrally formed with the sidewalls 32, 34 and extends therebetween. In addition to the upper track 30, the main portion 14 of the seat frame 12 also includes a front torsion tube or bar 38, front motion control links 40, a rear torsion tube 42, rear motion control links 44, and a pair of seat support members 46. Specifically, the two opposed upper tracks 30 are in a spaced parallel relationship to one another with the front torsion tube 38 and the rear torsion tube 42 supported therebetween at the front and rear ends of the upper tracks 30, respectively. The front and rear torsion tubes 38 and 42 are rotatably mounted in, and extend through apertures 48 formed in the sidewalls 32 and 34 of the upper tracks 30. The ends of the front torsion tube 38 are operatively connected to the front motion control links 40, which are in turn pivotally connected to each forward end of the seat support member 46. Likewise, the ends of the rear torsion tube 42 are operatively connected to the rear motion control links 44, which are in turn pivotally connected to each rear end of the seat support members 46.

The seat frame 12 also includes a seat drive mechanism, generally indicated at 50. The seat drive mechanism 50 of the seat frame 12 includes a horizontal drive portion, generally indicated at 52 and a vertical drive portion, generally indicated at 54. The horizontal drive portion 52 includes at least one drive motor having a lead screw that is operatively connected to, and in driven relationship with, the drive motor. The lead screw has external threads defined thereon. More specifically, the horizontal drive portion 52 of the seat drive mechanism 50 includes a bi-directional electric drive motor 56 that is fixedly mounted to the opposed upper track assemblies 20 by mounting bracket 58 to provide horizontal motive force. The horizontal drive motor 56 has a pair of opposed drive shafts 62 extending outward from its opposite ends toward the upper track assemblies 20. Each drive shaft 62, which may be a rigid, tubular member or a flexible cable, rotatably passes through an aperture 64 formed in the sidewall 32 of each of the upper tracks 30. Each drive shaft 62 is connected to a horizontal drive transmission gearbox 66. Each horizontal drive transmission gearbox 66 is securely connected to the upper track 30 by a roll pin 68, which extends between the upper track sidewalls 32, 34. Each gearbox 66 is operatively connected to a lead screw 70.

The horizontal drive transmission gearboxes 66 are of conventional construction and each, by way of non-limiting example, may include a worm and worm gear supported within the gearbox housing. Though not shown, it should be appreciated by those having ordinary skill in the art that, as is typical, the worm receives one end of the horizontal drive shaft 62 and threadingly engages the worm gear, which is formed about or mounted on one end of a threaded horizontal drive lead screw 70. In this manner, the horizontal drive transmission gearboxes 66 serve to translate the rotation of the output drive shafts 62 of the horizontal drive motor 56 by 90 degrees to rotate the two horizontal lead screws 70. It should be further appreciated that the horizontal drive transmission gearboxes 66 are constructed so that the two lead screws 70 rotate in the same direction in response to the drive motor 56.

Figure 2B:
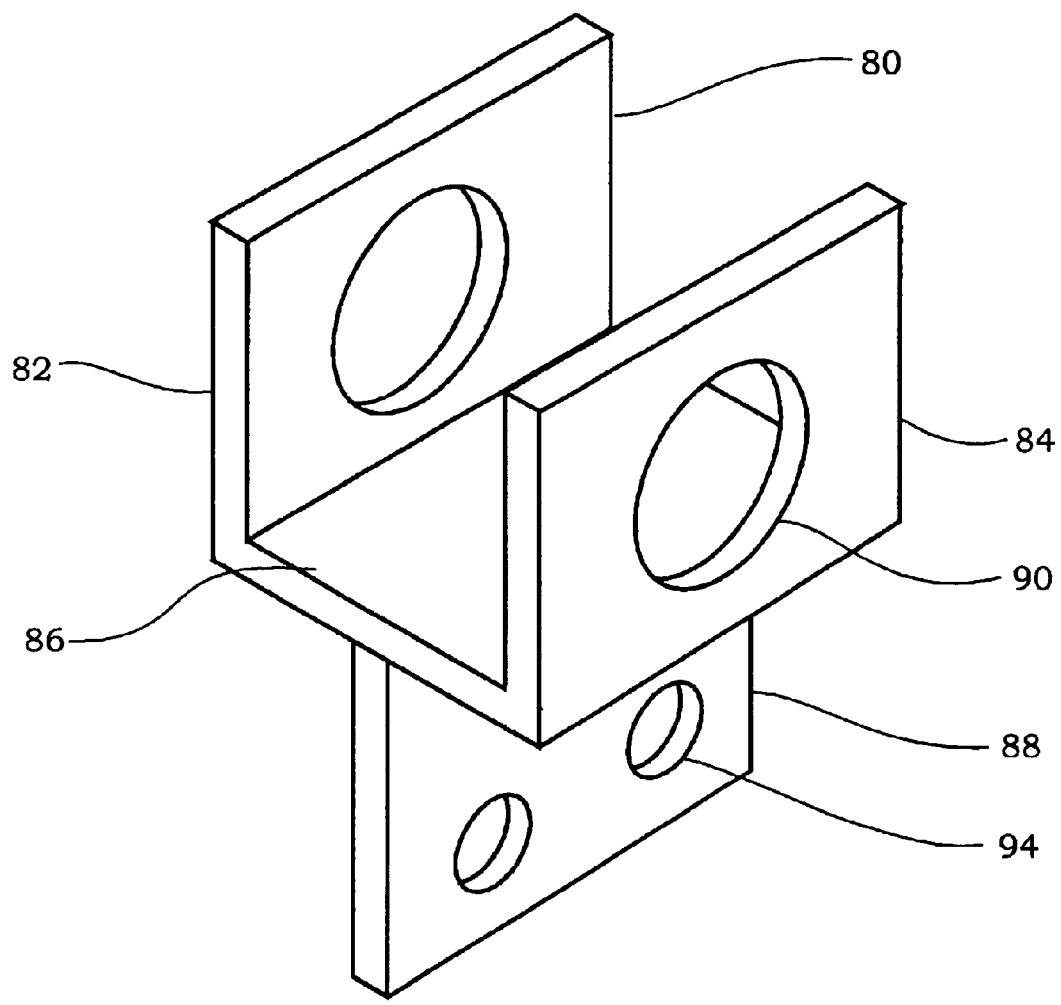
FIG. 2B is a perspective view of a drive nut bracket of the present invention.

A pair of drive nuts 72 having through-bores 74 (FIG. 3A) are fixedly mounted to the lower tracks 24 of the riser portion 18 of the seat frame 12. The through-bore 74 of drive nut 72 has internal threads 76 (FIGS. 3A, 3B) that cooperate with the external threads 78 of the lead screw 70. The interaction of the lead screws 70 and the drive nuts 72 cause the seat assembly 10 to move horizontally in at least two opposed directions in response to the operation of the drive motor 56. More specifically, as shown in FIG. 2A, each drive nut 72 is mounted in a drive nut bracket 80. Each drive nut bracket 80 is further mounted to one of the lower tracks 24. Referring to FIG. 2B, the drive nut brackets 80 are formed in a general "Y" shape having first and second sidewalls 82 and 84 integrally connected by a central base 86, with a leg 88 extending therefrom. An opening 90 is formed in each sidewall 82 and 84 to accept and retain the ends of the drive nut 72 as will be described below.

As shown in FIG. 2A, a lateral slot 92 is cut through each upper track 30 below and parallel to the lead screw 70. When the drive nut bracket 80 is installed in the seat frame 12, the leg 88 extends through the slot 92 and is fixedly connected to the lower track 24. The leg 88 is connected to the lower track 24 by suitable fasteners extending through apertures 94 formed in the leg 88. Thus, with the drive nut 72 mounted in the drive nut bracket 80, the drive nut 72 is coupled to the lower track 24 and is thereby fixed relative to the vehicle floor pan. The slot 92 allows the leg 88 of the drive nut bracket 80 to pass through and further allows the main portion 14 of the seat frame 12 to slidingly move either left or right (as illustrated in FIG. 2A), relative to the riser portion 18, in response to the driving action of the motor 56. It should be appreciated that the seat assembly of this example could also have the seat drive mechanism 50 fixedly supported relative to the riser portion 18 of the seat frame 12 and the drive nut 72 mounted to the main portion 14 of the seat frame 12 to achieve the same operative results.

With continuing reference to FIG. 2A, the vertical drive portion 54 of the seat drive mechanism 50 includes a front vertical drive mechanism, generally indicated at 96 and a rear vertical drive mechanism, generally indicated at 98. The front vertical drive mechanism 96 includes a front vertical drive motor 100, a front vertical drive shaft 102, a gearbox 104, and a front vertical lead screw 106. The front vertical lead screw 106 is externally threaded and cooperatively engages an internally threaded bore 108 in a tubular drive member 110. The tubular drive member 110 also has an open ended slot 112 extending from the end opposite the internally threaded bore 108. The slot 112 accepts and is pivotably connected to a front pivot link 114 that is operatively connected to, and extends outward from, the front torsion tube 38. In this manner, the front vertical drive gearbox 104 serves to translate the rotation of the output shaft 102 of the front vertical drive motor 100 by 90 degrees to rotate the front vertical lead screw 106. Rotation of the front vertical lead screw 106 causes linear movement of the tubular drive member 110 due to the threading interaction of the lead screw 106 with the internally threaded bore 108 of the tubular member 110. This interaction causes the linear movement of the tubular member 110 to be converted to pivotal movement of the front motion control links 40 which thereby causes a vertical movement of the front ends of the seat support members 46. Thus, the front of the seat assembly 10 is moved vertically in at least two opposed directions in response to the driving action of the front vertical drive motor 100.

Similarly, the rear vertical drive mechanism 98 includes a rear vertical drive motor 116, a rear vertical drive shaft 118, a gearbox 120, and a rear vertical lead screw 122. The rear vertical lead screw 122 is externally threaded and cooperatively engages an internally threaded bore 124 of a tubular drive member 126. The tubular drive member 126 also has an open-ended slot 128 extending from the end opposite the internally threaded bore 124. The slot 128 accepts and is pivotably connected to a rear pivot link 130 that is operatively connected to, and extends outward from, the rear torsion tube 42. In this manner, the rear vertical drive gearbox 120 serves to translate the rotation of the output shaft 118 of the rear vertical drive motor 116 by 90 degrees to rotate the rear vertical lead screw 122. Rotation of the rear vertical lead screw 122 causes linear movement of the tubular drive member 126 due to the threading interaction of the lead screw 122 with the internally threaded bore 124 of the tubular drive member 126. This interaction causes the linear movement of the tubular drive member 126 to be converted to pivotal movement of the rear motion control links 44, which thereby causes a vertical movement of the rear ends of the seat support members 46. Thus, the rear of the seat assembly 10 is moved vertically in at least two opposed directions in response to the driving action of the rear vertical drive motor 116.

As shown in FIG. 2A, the three drive motors 56, 100, and 116 may be arranged for example, side-by-side and interconnected by end caps 132, which provides a combined electrical connector 134. It should be appreciated that individually encased motors could also be used in connection with the seat drive mechanism 50 of the present invention. Further details concerning the construction and operation of the drive motors 56, 100, and 116 for controlling the movement of the seat may be found in U.S. Pat. No. 5,292,164 issued Mar. 08, 1994 and assigned to the assignee of the present invention. The disclosure of the '164 patent is incorporated herein by reference.

Figure 3A:
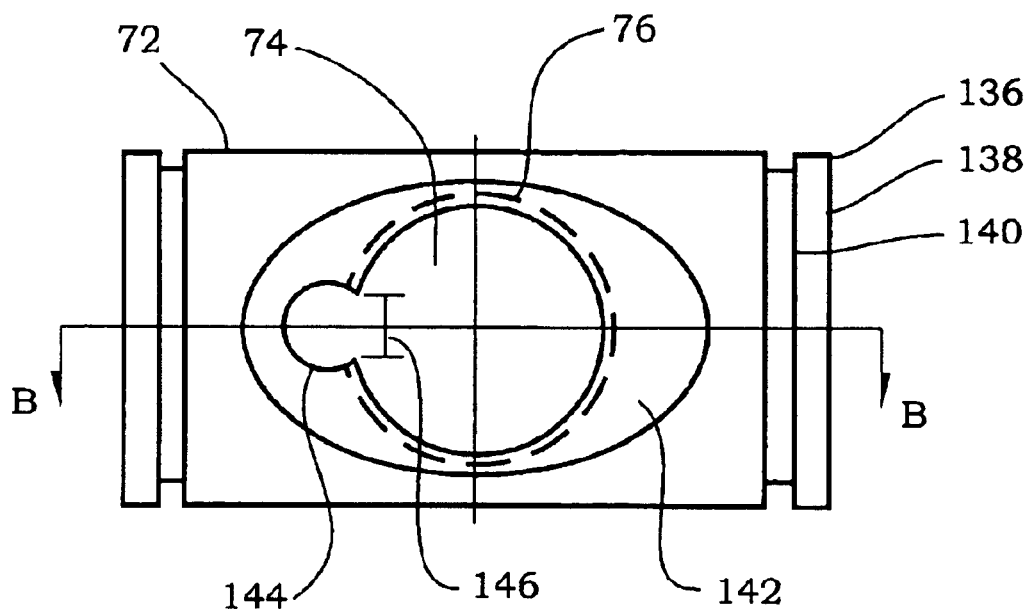
FIG. 3A is a side view of a drive nut of the present invention having a clearing bore.
Figure 3B:
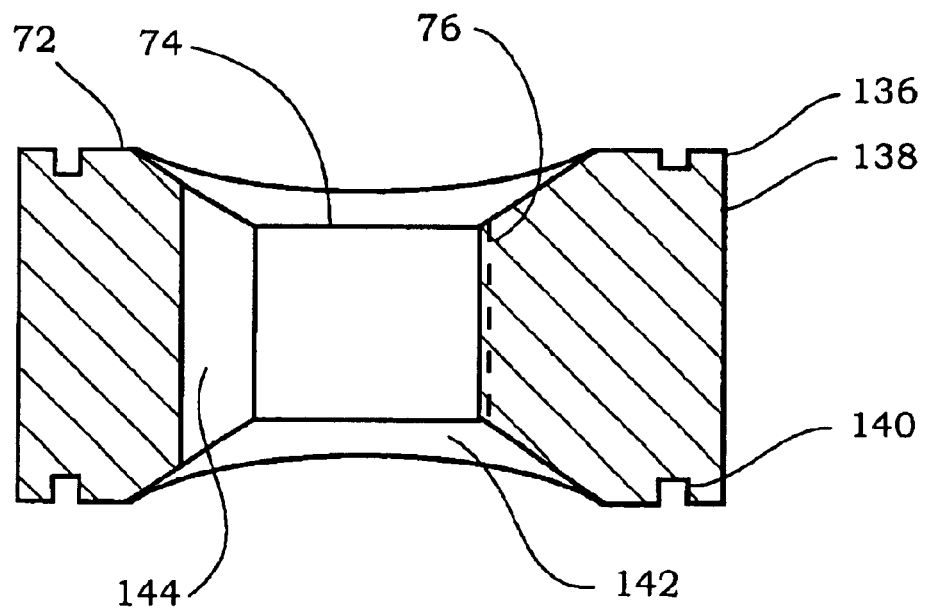
FIG. 3B is a cross-sectional view of a drive nut of the present invention having a clearing bore.

As shown in greater detail in FIGS. 3A and 3B, to mount the drive nut 72 in the drive nut bracket 80, the ends of the drive nut 72 have formed retaining portions 136. The retaining portions 136 include an end lip 138 and an annular retaining groove 140. In this manner, the drive nut 72 is rotatively retained in the drive nut bracket 80 by the insertion of conventional circular locking clips, such as "circlips", "e-clips", or "snap-ring" clips in the annular retaining grooves 140 of the drive nut 72 after it is inserted in the openings 90 in the bracket sidewalls 82, 84 (FIG. 2B). It should be appreciated that given the application, having a retaining portion 136 on both sides of the drive nut 72 may not be necessary, and other variations in the manner in which the drive nut 72 is mounted and retained in the seat frame 12 are within the scope and spirit of the invention. For example, the drive nut 72 may have a retaining portion 136 formed only on one end.

As mentioned above, the drive nut 72 has a through-bore 74 with internal threads 76 that cooperate with the external threads 78 of the lead screw 70. The drive nut 72 also includes a concave flare 142 on both sides of the through-bore 74 to promote smooth threaded interaction with the lead screw 70 as it is driven in and out of the drive nut 72. To overcome the jamming and binding tendencies of seat assemblies in the prior art, the drive nut 72 of the present invention includes a second bore 144 formed adjacent to the through-bore 74. The second bore 144 extends in the general direction of the through-bore 74 such that the internal threads 76 of the through-bore 74 are interrupted by the second bore 144. The interrupted threads of the through-bore 74 act to clear the threads 78 of the lead screw 70 and cause any foreign matter that collects on the lead screw 70 to be captured by the second bore 144 and prevented from entering the thread interface between the drive nut 72 and the lead screw 70.

More specifically, the second bore 144 has an arcuate shape in cross-section and is located in reference to the through-bore 74 so that the second bore 144 not only provides an interruption of the threads of the through-bore 74, but also provides an opening 146. The second bore 144 is thereby located to provide an opening 146 having an aperture size capable of collecting and trapping particulate matter or debris of a general size that is known to jam into the thread interface between the lead screw 70 and the drive nut 72. Thus, it should be appreciated that the desired aperture size of the opening 146 in relation to capturing a particular size range of particulate matter or debris is driven by the relative diameters and thread sizes of the drive nut and lead screw. In other words, the choice of how large or small to make the aperture size of the opening 146 is dependant of the size of the material that could possibly become jammed into the threads. Larger diameter leads screws or looser lead screw and drive nut thread interfaces typically allow larger size particulate material to enter and jam the threads than those of a smaller diameter or tighter thread interface. The aperture size may be adjusted accordingly. It should be further appreciated that the second bore 144 may be formed in the drive nut 72 through any one of a variety of known techniques, such as drilling, or boring, or molding for example. It should be still further appreciated that the second bore 144, as it is formed about the diameter of the through-bore 74 of the drive nut 72 may be located at any radial orientation about the through-bore 74 without departing from the scope of the invention. Therefore, the self-clearing drive nut 72 of the present invention provides a clean thread interface between the lead screw 70 and the drive nut 72. This counteracts any collection of debris on the lead screw 70, which causes binding and jamming of the seat drive mechanism 50. Thus, the present invention provides for smooth and trouble free operation of the seat assembly 10.

Figure 4:
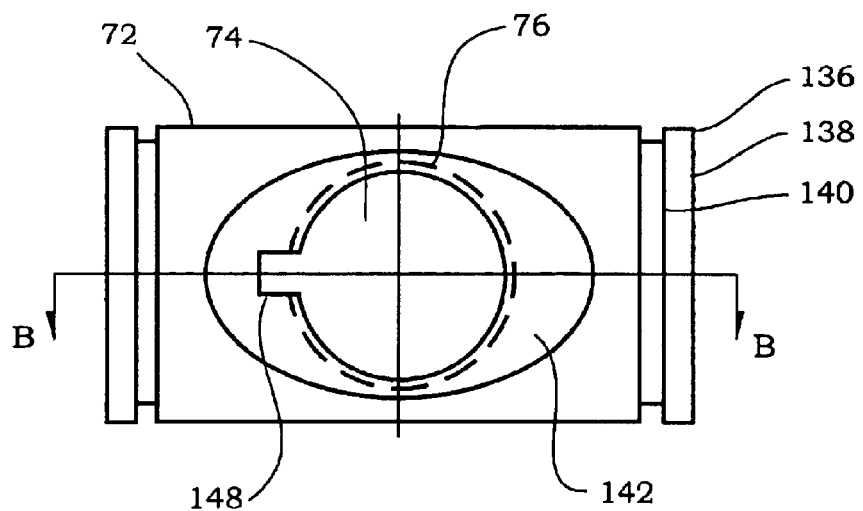
FIG. 4 is a side view of a drive nut of the present invention having a clearing groove.

It should be further appreciated that, as shown in FIG. 4, the second bore may be a groove 148 formed longitudinally along the outer diameter of the through-bore 74 to interrupt the threads 76 of the through-bore 74 by having a depth at least equal to the distance between the crest and the root of the threads of the through-bore 74. In this case, the interrupted threads caused by the groove 148 are adapted to clear the threads of the lead screw 70 and cause any foreign matter entering the threads of the drive nut 72 to be captured in the groove 148 as the lead screw 70 operatively moves within the drive nut 72.

Figure 5:
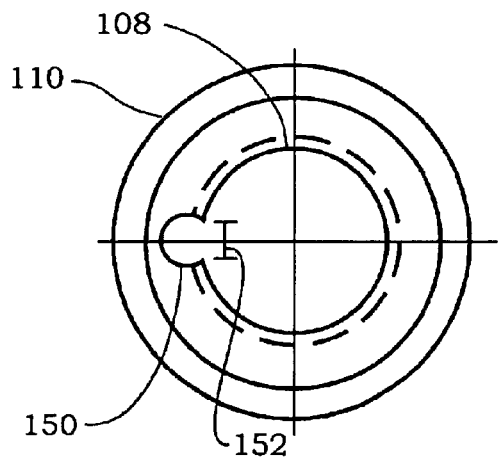
FIG. 5 is an end view of a first tubular drive member of the present invention having a clearing bore.
Figure 6:
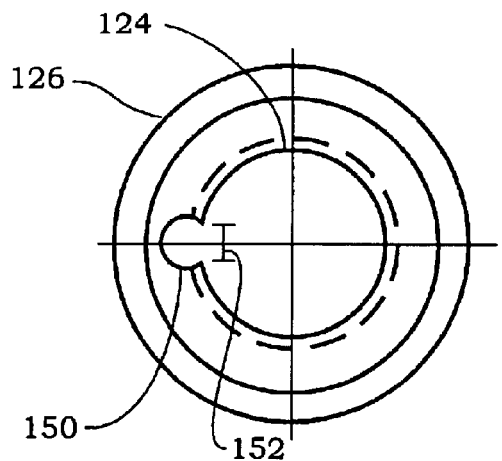
FIG. 6 is an end view of a second tubular drive member of the present invention having a clearing bore.

In a similar manner to the drive nuts 72, the tubular drive members 110 and 126 threadingly interact with lead screws 106 and 122 respectively. Thus, the tubular drive members 106, 122 also benefit from the self-clearing features of the drive nut 72 of the present invention. As shown in greater detail in FIGS. 5 and 6, tubular drive members 110, 126 include second bores 150 formed adjacent to the internally threaded bores 108 and 124, respectively. The second bores 150 extend in the general direction of the internally threaded bores 108, 124 such that the internal threads of the tubular drive members 110, 126 are interrupted by the second bores 150. The interrupted threads of the internally threaded bores 110, 126 act to clear the threads of the lead screws 106, 122. This causes any foreign matter that collects on the lead screws 106, 122 to be captured by the second bores 150 and prevented from entering the thread interface between the tubular drive members 110, 126 and the lead screws 106, 122, respectively. Therefore, the seat assembly 10 of the present invention has a self clearing drive nut 72 and self clearing front and rear tubular drive members 110 and 126 to provide a clean thread interface between these drive elements and their respective lead screws (70, 106, and 122).

As discussed above regarding the drive nuts 72, the second bores 150 of the tubular drive members 110, 126 have an accurate shape in cross-section and are located in reference to the internally threaded bores 108, 124 so that the second bores 150 not only provides an interruption of the threads of the internally threaded bores 108, 124 but also provide respective openings 152. The second bores 150 are thereby located to provide openings 152 having an aperture size capable of collecting and trapping particulate matter or debris of a general size that is known to jam into the thread interface between the lead screw and the tubular drive member. Thus, it should be appreciated that the desired aperture size of the openings 152 in relation to capturing a particular size range of particulate matter or debris is driven by the relative diameters and thread sizes of the drive member and lead screw. In other words, the choice of how large or small to make the aperture size of the openings 152 is dependent of the size of the material that could possibly become jammed into the threads. Larger diameter leads screws or looser lead screw and tubular drive member thread interfaces typically allow larger size particulate material to enter and jam the threads than those of a smaller diameter or tighter thread interface. The aperture size may be adjusted accordingly. It should be further appreciated that the second bores 152 may be formed in the tubular drive members 110, 126 through any one of a variety of known techniques, such as drilling, or boring, or molding for example. It should be still further appreciated that the second bores 152, as formed about the diameter of the internally threaded bores 110, 126 of the tubular drive members 110, 126 may be located at any radial orientation about the bores without departing from the scope of the invention. Therefore, the self clearing features of the tubular drive members 110, 126 of the present invention provide a clean thread interface between the lead screws 106, 122 and the internally threaded bores 108, 124 of the tubular drive members 110, 126. This counteracts any collection of debris on the lead screws 106, 122, which causes binding and jamming of the seat drive mechanism 50. Thus, the present invention provides for smooth and trouble free operation of the seat assembly 10

Figure 7:
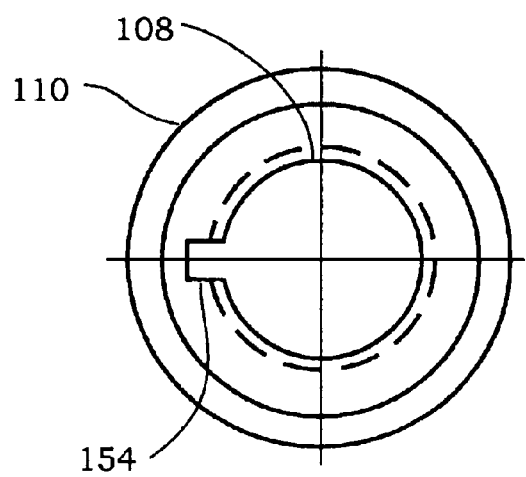
FIG. 7 is an end view of a first tubular drive member of the present invention having a clearing groove.
Figure 8:
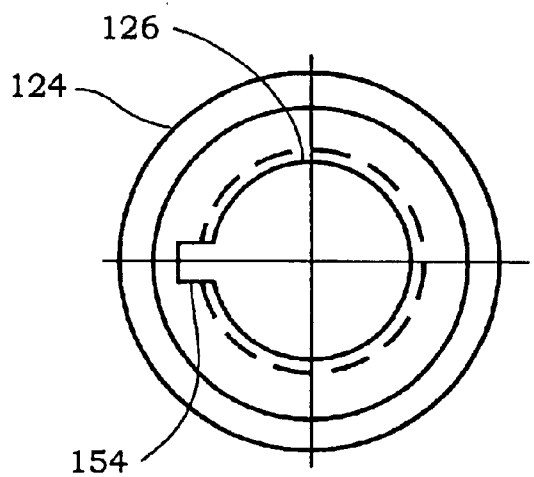
FIG. 8 is an end view of a second tubular drive member of the present invention having a clearing groove.

It should be appreciated that in a similar manner to the groove 148 shown in FIG. 4 for the drive nut 72, the second bores of the vertical drive members 110 and 126 may be a groove 154 (FIGS. 7 and 8) formed longitudinally along the outer diameter of the internally threaded bores 108 and 124. Thus, the groove 154 interrupts the threads of the internally threaded bores 108, 124 by having a depth at least equal to the distance between the crest and the root of the threads of the internally threaded bores 108, 124, respectively. In this case, the interrupted threads caused by groove 154 are adapted to clear the threads of the lead screws 106, 122 and cause any foreign matter entering the threads of the tubular drive members 110, 126 to be captured in the grooves 154 as the lead screws 106, 122 operatively move within the tubular drive members 110, 126, respectively.

In this manner, the present invention eliminates any collection of debris that causes binding and jamming of the seat drive mechanism 50 in any operative direction of movement and provides smooth, trouble free operation of the seat assembly 10.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. An automotive seat assembly comprising:
   a seat frame having a main portion fixedly mounted to the bottom of a vehicle seat and a riser portion fixedly mounted to the floor pan of a vehicle, said riser portion including a first pair of tracks and said main portion including a cooperative second pair of tracks such that said main portion is moveably supported with respect to said riser portion along said first and second pair of tracks;
   a seat drive mechanism including at least one drive motor and a lead screw operatively connected in driven relationship with respect to said drive motor, said lead screw having external threads defined thereon;
   a drive nut having a through-bore with internal threads that cooperate with said threads of said lead screw, said drive nut adapted to cause said seat assembly to move in at least two opposed directions relative to the vehicle floor pan in response to said drive motor;
   said drive nut also including a second bore formed adjacent to said through-bore and extending in the general direction of said through-bore such that said internal threads of said through-bore are interrupted by said second bore, said interrupted threads of said through-bore acting to clear said threads of said lead screw and cause foreign matter that collects on said lead screw to be captured by said second bore and prevented from entering the threaded interface between said drive nut and said lead screw.

2. An automotive seat assembly as set forth in claim 1 wherein said second bore of said drive nut has an arcuate shape in cross-section and is located in reference to said through bore so that said second bore provides an interruption of the threads of said through-bore and also provides an opening having an aperture, said aperture adapted to clear the threads of said lead screw and cause foreign matter entering the threads of said drive nut to be captured in said groove as said lead screw operatively moves within said drive nut.

3. An automotive seat assembly as set forth in claim 1 wherein said second bore of said drive nut is a groove formed longitudinally along the outer diameter of said through-bore to interrupt the threads of said through-bore by having a depth at least equal to the distance between the crest and the root of the threads of said through-bore, the interrupted threads caused by said groove adapted to clear the threads of said lead screw and cause foreign matter entering the threads of said drive nut to be captured in said groove as said lead screw operatively moves within said drive nut.

4. An automotive seat assembly as set forth in claim 1 wherein said seat drive mechanism is fixedly supported relative to said riser portion of said seat frame and said drive nut is mounted to said main portion of said seat frame.

5. An automotive seat assembly as set forth in claim 1 wherein said seat drive mechanism is fixedly supported relative to said main portion of said seat frame and said drive nut is mounted to said riser portion of said seat frame.

6. An automotive seat assembly as set forth in claim 5 wherein said seat assembly further includes a drive nut bracket mounted to said riser portion of said seat frame and adapted to retain said drive nut, said drive nut bracket having at least one opening formed to accept and retain said drive nut.

7. An automotive seat assembly as set forth in claim 6 wherein said drive nut has a cylindrical shape and includes at least one retaining portion having an end lip and an annular retaining groove, said drive nut adapted to be rotatively supported and retained in said opening of said drive nut bracket by the insertion of a locking clip in said annular retaining groove.

8. An automotive seat assembly comprising:
   a seat frame having a pair of seat support members fixedly mounted to the bottom of a vehicle seat and including at least one vertical drive mechanism fixedly mounted with respect to the vehicle floor pan such that said seat support members are moveably supported with respect to said at least one vertical drive mechanism;
   said at least one vertical drive mechanism having a drive motor and a lead screw operatively connected in driven relationship with respect to said drive motor, said lead screw having external threads defined thereon;
   a drive member mounted to said pair of seat support members and having an internally threaded bore that cooperates with said threads of said lead screw, said drive member adapted to cause said seat assembly to move in at least two opposed vertical directions relative to the vehicle floor pan in response to said drive motor;
   said drive member also including a second bore formed adjacent to said internally threaded bore and extending in the general direction of said internally threaded bore such that said internal threads of said drive member are interrupted by said second bore, said interrupted threads of said internally threaded bore acting to clear said threads of said lead screw and cause any foreign matter that collects on said lead screw to be captured by said second bore and prevented from entering the thread interface between said drive member and said lead screw.

9. An automotive seat assembly as set forth in claim 8 wherein said second bore of said drive member has an arcuate shape in cross-section and is located in reference to said internally threaded bore so that said second bore provides an interruption of the threads of said internally threaded bore and also provides an opening having an aperture, said aperture adapted clear the threads of said lead screw and cause foreign matter entering the threads of said drive member to be captured in said groove as said lead screw operatively moves within said drive member.

10. An automotive seat assembly as set forth in claim 9 wherein said second bore of said drive member is a groove formed longitudinally along the outer diameter of said internally threaded bore to interrupt the threads of said internally threaded bore by having a depth at least equal to the distance between the crest and the root of the threads of said internally threaded bore, the interrupted threads caused by said groove adapted to clear the threads of said lead screw and cause foreign matter entering the threads of said drive member to be captured in said groove as said lead screw operatively moves within said drive member.

* * * * *